(12) United States Patent
Peterson et al.

(10) Patent No.: US 11,086,576 B2
(45) Date of Patent: Aug. 10, 2021

(54) RECOMMENDING PROPOSED PRINT SAVING ATTRIBUTES BASED ON PAPER AVAILABLE IN PRINTER

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); John C. Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/738,794

(22) Filed: Jan. 9, 2020

(65) Prior Publication Data

US 2021/0216255 A1    Jul. 15, 2021

(51) Int. Cl.
*G06F 3/12* (2006.01)
*H04N 1/23* (2006.01)

(52) U.S. Cl.
CPC .......... *G06F 3/1219* (2013.01); *G06F 3/1239* (2013.01); *H04N 1/2369* (2013.01)

(58) Field of Classification Search
CPC .................................................. G06F 3/1219
USPC ........................................................ 358/1.15
See application file for complete search history.

(56) References Cited

U.S. PATENT DOCUMENTS

| | | | |
|---|---|---|---|
| 2011/0090528 A1* | 4/2011 | Harrington | G06F 3/1239 358/1.15 |
| 2013/0194595 A1* | 8/2013 | Murata | G06F 3/125 358/1.9 |
| 2019/0042169 A1* | 2/2019 | Joy | H04N 1/00039 |

* cited by examiner

*Primary Examiner* — Jacky X Zheng
(74) *Attorney, Agent, or Firm* — VanLeeuwen & VanLeeuwen; Jason A. Friday (57) ABSTRACT

An approach is provided that sends a user a set of proposed paper saving attributes in response to determining that a paper supply of a printer is insufficient to print a print job without using the set of proposed paper saving attributes. The set of paper saving attributes for the print job is altered to the set of proposed paper saving in response to receiving a reply that is an affirmative reply. The file corresponding to the print job is then printed on the printer using the set of paper saving attributes.

17 Claims, 5 Drawing Sheets

RECOMMENDING PROPOSED PRINT SAVING ATTRIBUTES BASED ON PAPER AVAILABLE IN PRINTER

BACKGROUND

A workgroup printer is a device that accepts print jobs from multiple users on a common computer network, such as within an organization. The printer contains its own memory, a processor similar to a computer's, and a hard drive for storing fonts and print jobs. Workgroup printers are capable of handling print jobs from multiple users, depending on the printers' internal memory and hard drive capacity. Workgroup printers are capable of printing many pages before changing of the toner cartridges is required. While workgroup printers are useful, they have certain shortcomings. First, being a printer for a larger group of people, the printer is often located at a distance from a user's work location. Second, the users of the printer are often the people responsible for loading paper when the printer runs out of paper. These printers can often store multiple reams of paper in their paper tray, so loading the printer with paper can be time consuming to unwrap packaging from the reams of paper and manually place the paper in the printer's paper tray. When a user needs a printout quickly, such as picking up a report needed for a meeting and rushing to the meeting, having the paper run out of paper is inconvenient and can impact busy schedules.

SUMMARY

An approach is provided that sends a user a set of proposed paper saving attributes in response to determining that a paper supply of a printer is insufficient to print a print job without using the set of proposed paper saving attributes. The set of paper saving attributes for the print job is altered to the set of proposed paper saving in response to receiving a reply that is an affirmative reply. The file corresponding to the print job is then printed on the printer using the set of paper saving attributes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The figures show an approach that detects when the user's print job will exceed the number of blank sheets available in the printer. When this happens, the user is asked if they would like to print as much as possible, or if they would like to use proposed paper saving attributes (e.g., duplex printing (printing on the front and back of each sheet), printing multiple pages on each side of each sheet, etc.) so that the entire document can be printed with the number of blank sheets available in the printer's paper tray. This allows the user to fully print a document anytime there is at least enough paper in the paper tray to print the user's document by using particular paper saving attributes. In time-sensitive situations, the approach provides a quick change to paper saving attributes as opposed to scrambling last-minute to find more paper to load into the printer.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
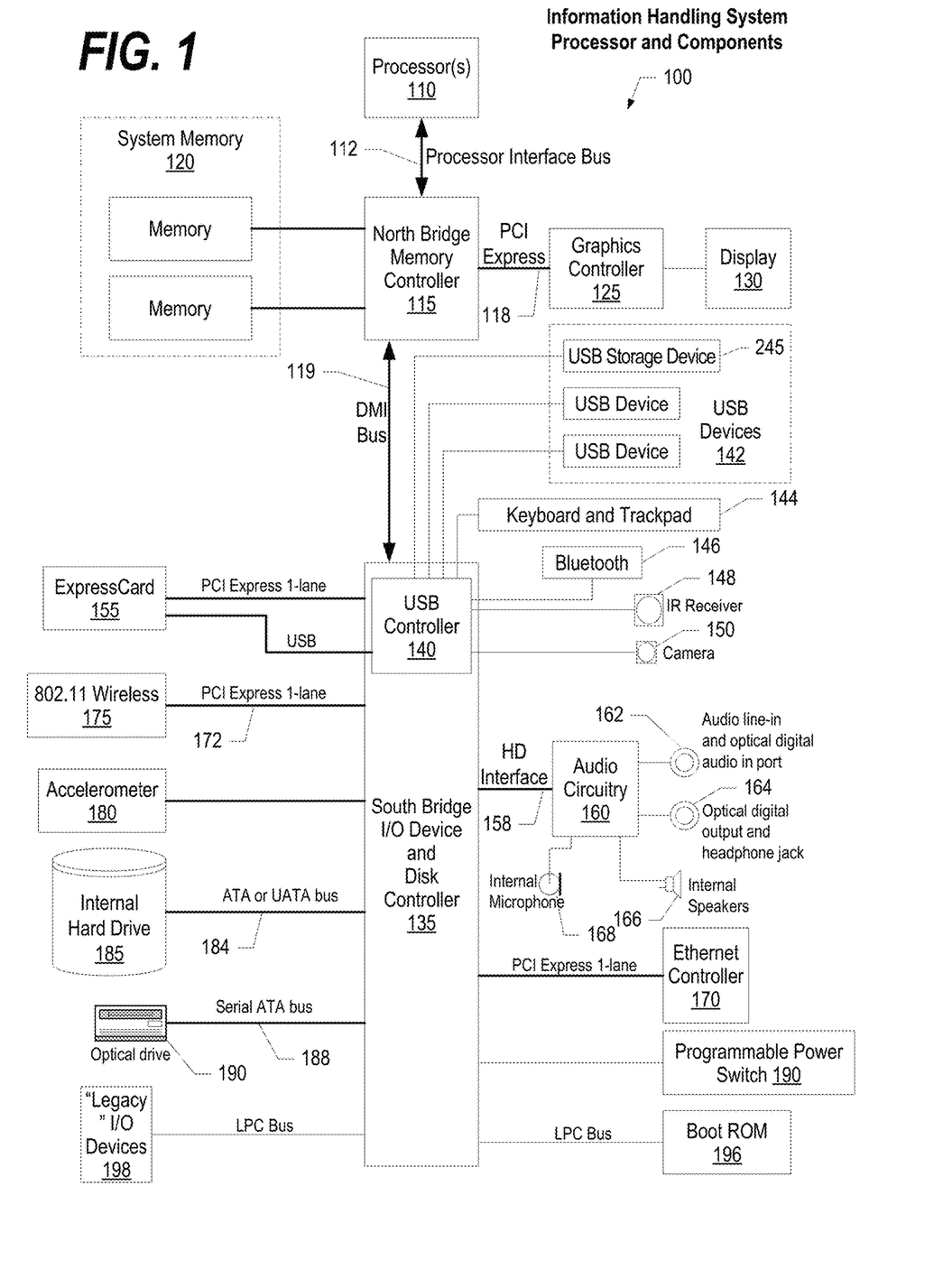
FIG. 1 is a block diagram of a data processing system in which the methods described herein can be implemented.
Figure 2:
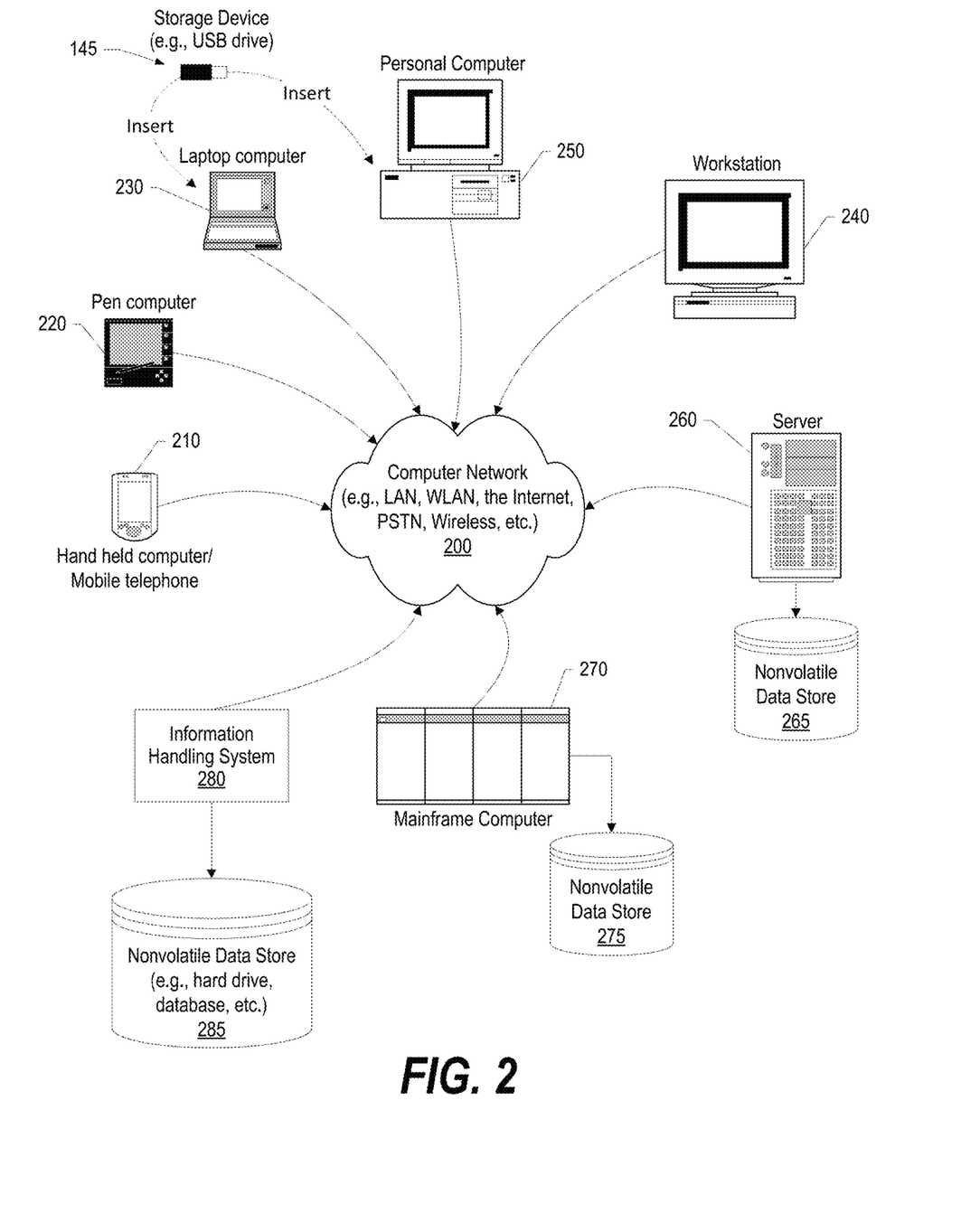
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
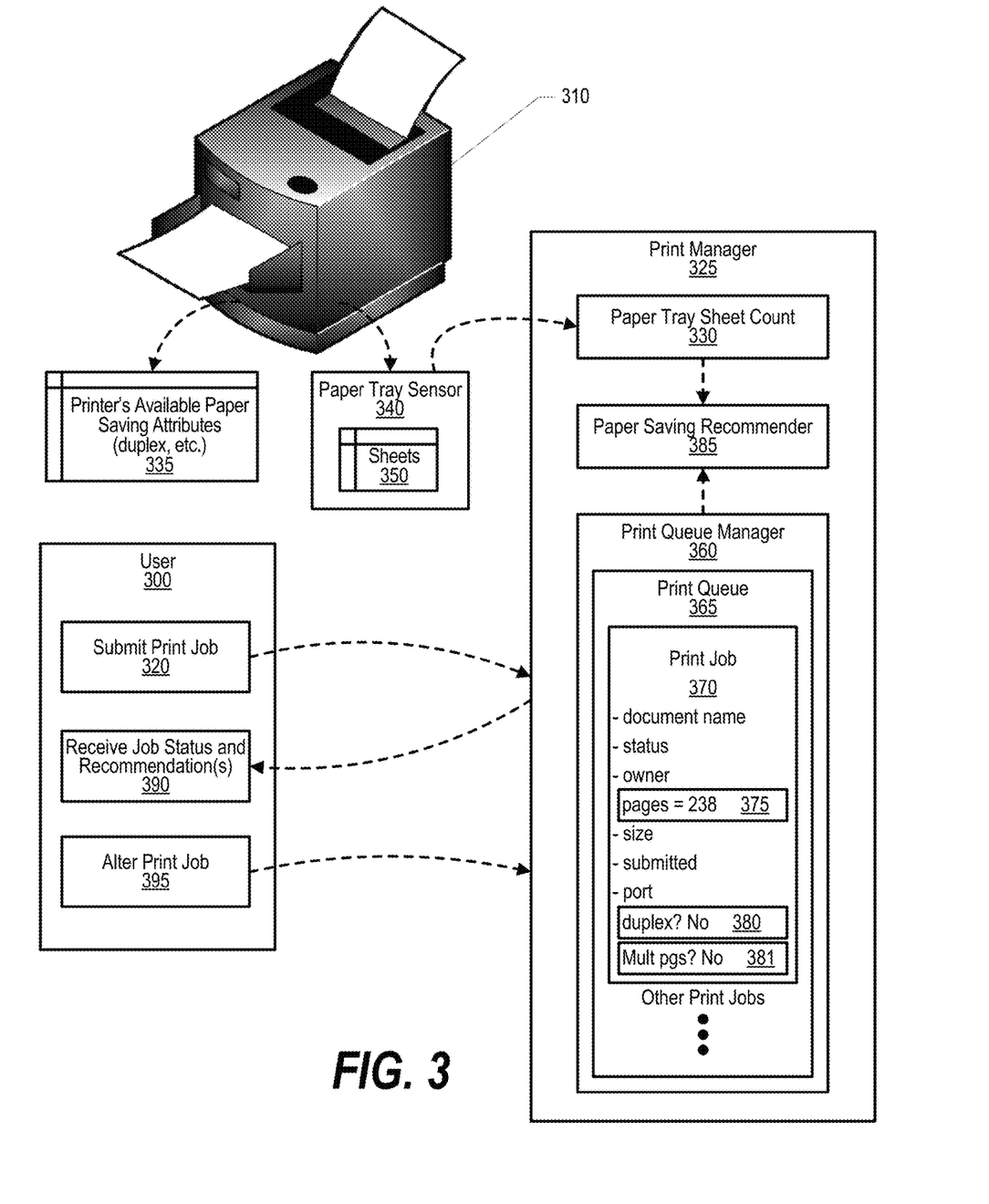
FIG. 3 is a component diagram depicting the components used in recommending paper saving attributes when printing a print job.

FIG. 3 is a component diagram depicting the components used in recommending paper saving attributes when printing a print job. User 300 submits a print job to have a file printed on printer 310, such as a laser printer, with the jobs printed on printer 310 being managed by print manager 325.

At step 320, user 300 submits a print job to have a file printed on printer 310. The submitted print job is received by print manager 325 that manages jobs sent to printer 310. At step 330, the print manager receives a paper tray sheet count, such as from paper tray sensor 340 that keeps track of the number of blank sheets in the paper tray utilized by printer 310 with the number of sheets maintained in memory area 350 that is accessible by print manager 325. In addition, print manager 325 retrieves the printer's available paper saving attributes from memory area 335. These attributes identify which print saving options are available on printer 310, such as whether the printer is capable of duplex printing, whether the printer can shrink the size of the page being printed in order to print multiple pages on a single side of a sheet of paper. This multiple page option can allow for various numbers of pages to be printed on a single sheet, such as two pages on one side of one sheet, four pages on one side of one sheet (in a two-by-two arrangement), nine pages on one side of one sheet (in a three-by-three arrangement), twenty five pages on one side of one sheet (in a five-by-five arrangement), and so on.

Print manager 325 includes print queue manager 360 that manages print queue 365 of print jobs, such as print job 370, that have been requested to be printed at printer 310. Print job includes a number of attributes regarding the file that is being printed and the printing characteristics that are being requested. Pages attribute 375 indicates the number of pages that are included in the particular print job. Paper saving attributes include duplex option 380 which is an attribute that indicates whether the print job is scheduled to be printed on single sided sheets (simplex) or on both sides (two sided) of the sheets of paper (duplex), and multi-page option 381 which is an attribute that indicates the number of pages to be printed on a single sheet.

Paper saving recommender process 385 identifies situations where a print job that is scheduled for simplex printing will be unable to complete before the sheets of paper in the printer's paper tray is exhausted, but the same job would be able to print if the job's print attributes were changed to print the file using additional paper saving attributes that were not included by the user when the user submitted the print job. When this situation is identified, the print manager sends a recommendation to user 300 to have the job printed using additional paper saving attributes.

Returning to user processing, at step 390, the user's device receives a recommendation to print the job submitted by the user using additional paper saving attributes in order to complete printing of the job before the paper is exhausted from the paper tray. At step 395, the user can reply to the print manger agreeing to the recommendation to change the attribute of the user's print job to the recommended paper saving attributes (an affirmative reply). The user can also decide to keep the set of attributes and not affirm use of the recommended paper saving attributes, in which case additional sheets of paper will have to be added to the paper tray utilized by printer 310 before the file can completely print the file referenced in the user's print job. In one embodiment, the print manager has a default setting (either leave the user's attributes alone or alter the print saving attributes of the print job to the recommended print saving attributes.

Figure 4:
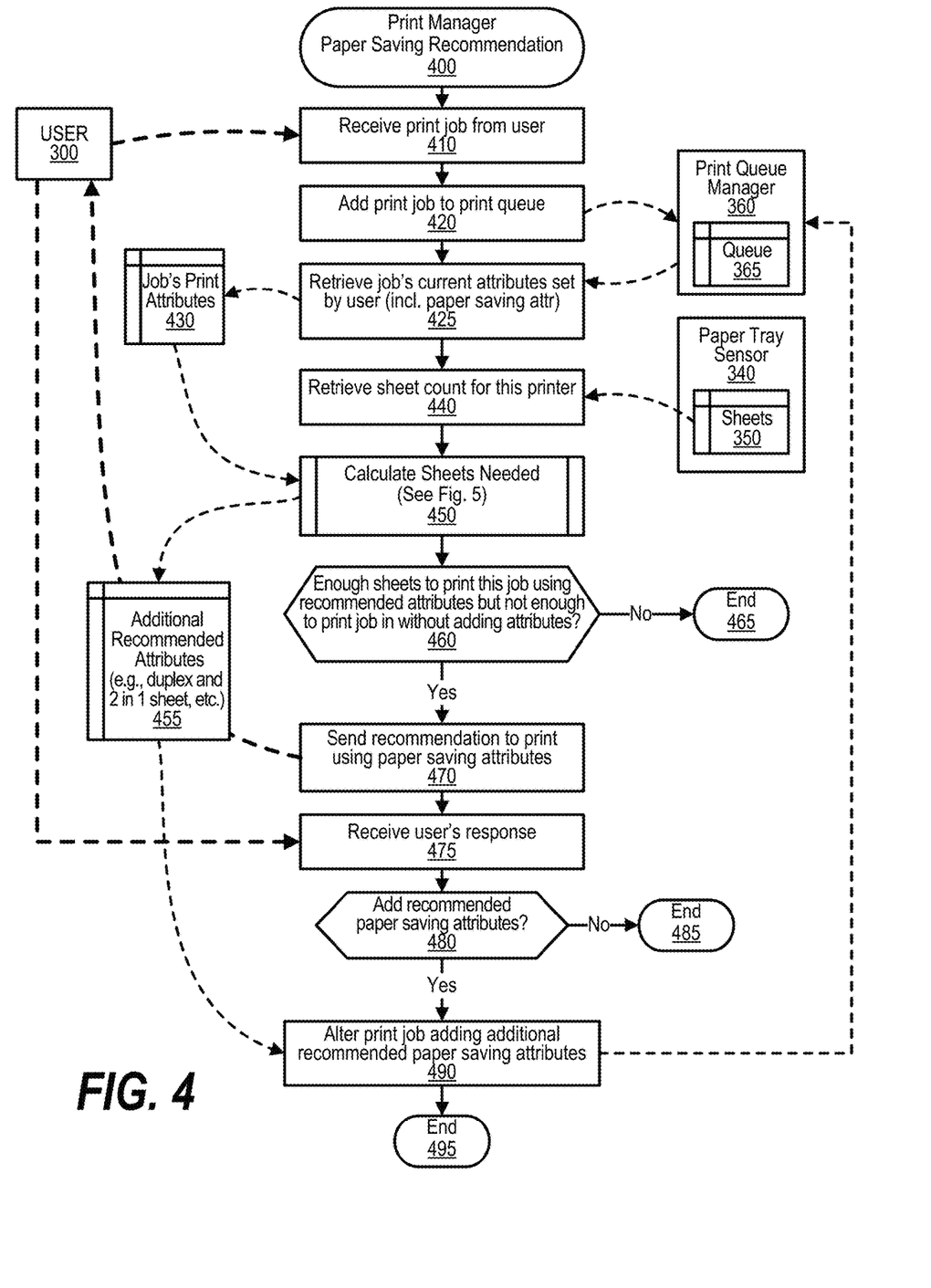
FIG. 4 is a flowchart showing steps taken by a process performed by a print manager to recommend paper saving attributes.

FIG. 4 is a flowchart showing steps taken by a process performed by a print manager to recommend paper saving attributes. FIG. 4 processing commences at 400 and shows the steps taken by a process that print Manager Paper Saving Recommendation. At step 410, the process receives a print job from user 300. At step 420, the process adds the received print job to print queue 365 that is managed by print queue manager 360. At step 425, the process retrieves the received print job's current set of attributes that were set by user. These attributes include any paper saving attributes that were set by the user, such as duplex printing or printing multiple pages on a single sheet of paper, etc. The attributes are stored in memory area 430.

At step 440, the process retrieves the sheet count for this printer from memory area 350 that is a number of pages in the printer's paper tray as determined by paper tray sensor 340. At predefined process 450, the process performs the Calculate Sheets Needed routine (see FIG. 5 and corresponding text for processing details). This routine uses the print job's attributes from memory area 430 and the available number of sheets from memory area 350 to identify any proposed paper saving attributes that are stored in memory area 465.

Based on the job's paper saving attributes, the number of sheets remaining in the printer's paper tray, and the printer's paper saving capabilities, predefined process 450 determined the proposed paper saving attributes stored in memory area 455 and also determined whether there are enough sheets in the printer's paper tray to print this job using the proposed paper saving attributes but not enough to print this job in without adding such paper saving attributes (decision 460). If there are enough sheets to print this job or it does not matter whether additional paper saving attributes are used, then decision 460 branches to the 'no' branch and processing ends at 465 using the set of paper saving attributes originally chosen by the user. On the other hand, if there are enough sheets in the printer's paper tray to print this job using the proposed paper saving attributes but not enough to print this job in without adding such paper saving attributes, then decision 460 branches to the 'no' branch to send the proposed paper saving attributes to user 300.

At step 470, the process sends the proposed paper saving attributes stored in memory area 455 to user 300. At step 475, the process receives a response, either from the user electing to use (affirm) the proposed paper saving attributes or to disregard such paper saving attributes. In addition, in one embodiment, if the user does not reply to the proposed paper saving attributes within a certain period of time (e.g., thirty seconds, etc.), then a default reply (e.g., either affirming or denying the proposed paper saving attributes) is used as the user's response.

The process determines as to whether the reply affirms the proposed paper saving attributes agreeing to add the proposed paper saving attributes to the attributes of the print job (decision 480). If the reply affirms the proposed paper saving attributes, then decision 480 branches to the 'yes' branch, whereupon at step 490, the process alters print job adding additional proposed paper saving attributes of the print job in the print queue, and processing ends at 495. On the other hand, if the reply does not affirm the proposed paper saving attributes, then decision 480 branches to the 'no' branch and processing ends at 485 without altering the paper saving attributes that the user originally selected for the print job.

Figure 5:
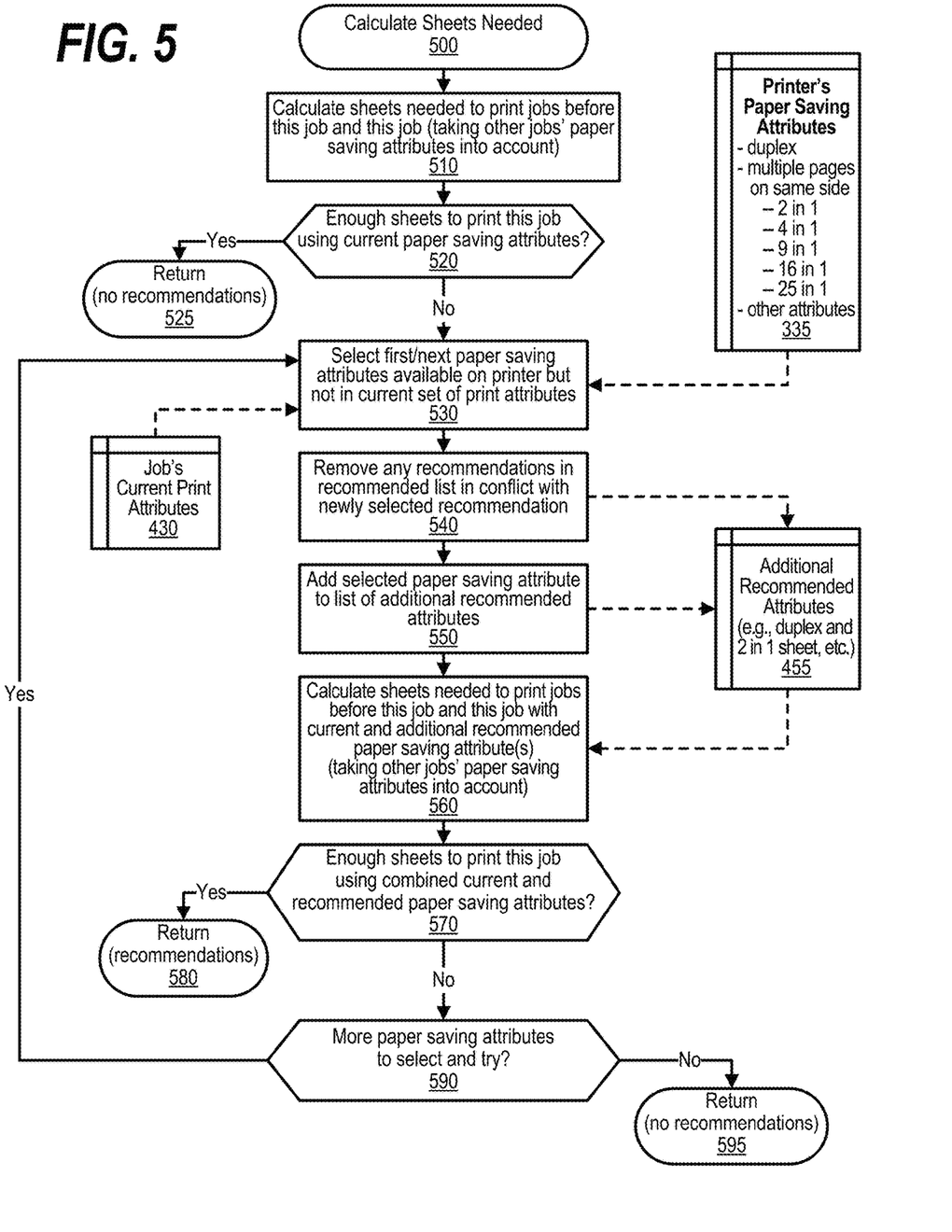
FIG. 5 is a flowchart showing steps taken by a process that calculates the number of sheets needed to print a file given various paper saving attributes.

FIG. 5 is a flowchart showing steps taken by a process that calculates the number of sheets needed to print a file given various paper saving attributes. FIG. 5 processing commences at 500 and shows the steps taken by a process that calculates the number of sheets needed to print a print job. At step 510, the process calculates the number of sheets needed to print all of the print jobs scheduled to print before this job (before this job in the print queue) as well as the number of sheets needed to print this print job. This calculation takes the other print jobs' paper saving attributes into account (duplex jobs, etc.) as well as any original paper saving attributes that the user already selected to use for this print job (duplex, multiple pages per sheet, etc.).

The process determines as to whether there are enough sheets in the printer's paper tray to print this job and any preceding jobs using the currently paper saving attributes selected for each of the print jobs (decision 520). If there are enough sheets in the printer's paper tray to print this job and any preceding jobs using the currently paper saving attributes selected for each of the print jobs, then decision 520 branches to the 'yes' branch whereupon processing returns to the calling routine (see FIG. 4) at 525 with no proposed paper saving attributes. On the other hand, if there are not enough sheets in the printer's paper tray to print this job as well as any preceding jobs using the currently paper saving attributes selected for each of the print jobs, then decision 520 branches to the 'no' branch for further processing.

At step 530, the process selects the first paper saving attribute from memory area 335 with these paper saving attributes being those that are available on the printer but not currently in the print job's set of paper saving attributes. Examples of paper saving attributes include duplexing, printing multiple pages of the document on a single sheet, and the like. At step 540, the process removes any proposed paper saving attributes that are already in paper saving attributes 455 that are in conflict with the newly selected paper saving attribute. For example, if the newly selected paper saving attributes is "multiple printing four pages on one side of a piece of paper" and the current set of proposed paper saving attributes already has "multiple printing two pages on one side of a piece of paper", then printing two pages on a side is in conflict with printing four pages as the printer can obviously only have one of these settings.

At step 550, the process adds the newly selected paper saving attribute to the list of proposed paper saving attributes stored in memory area 455. At step 560, the process calculates the sheets needed to all of the print jobs before this print job and then print this print job with this job's current and proposed paper saving attribute(s). Like before, this calculation takes other print jobs' paper saving attributes into account.

The process determines as to whether there are enough sheets of paper in the paper tray to print this print job and any/all preceding print jobs using the combined current and proposed paper saving attributes (decision 570). If there are enough sheets of paper in the paper tray to print this print job and any/all preceding print jobs using the combined current and proposed paper saving attributes, then decision 570 branches to the 'yes' branch whereupon processing returns to the calling routine (see FIG. 4) with the proposed paper saving attributes in memory area 455 to recommend to the user. On the other hand, if there are enough sheets of paper in the paper tray to print this print job and any/all preceding print jobs using the combined current and proposed paper saving attributes, then decision 570 branches to the 'no' branch for further processing.

The process determines as to whether there are any more paper saving attributes to select and use to re-calculate whether this job can print as described above (decision 590). If there are any more paper saving attributes to select and use, then decision 590 branches to the 'yes' branch which loops back to step 530 to select and use the next paper saving attributes from memory area 335 as described above. This looping continues until there are no more paper saving attributes to select, at which point decision 590 branches to the 'no' branch exiting the loop and processing returns to the calling routine (see FIG. 4) with no proposed paper saving attributes to send to the user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a printer accessible from the information handling system, the method comprising:
   retrieving an available number of sheets in a paper supply using a paper quantity sensor that identifies a number of sheets in a paper tray of the printer, wherein a print job is set to use a plurality of sheets from the paper tray during the printing, and wherein the print job is queued in a print queue that includes a plurality of print jobs including the print job;
   determining a first number of sheets needed to print the print job using the set of paper saving attributes before the altering;
   determining a second number of sheets needed to print the print job using the set of proposed paper saving attributes;
   determining a third number of sheets needed to print a first set of the plurality of print jobs that are queued to print before the print job;
   calculating a first total number of sheets by adding the first number of sheets and the third number of sheets, and calculating a second total number of sheets by adding the second number of sheets and the third number of sheets, wherein the sending and the altering are performed in response to the first total number of sheets being greater than the available number of sheets and the second total number of sheets being less than the available number of sheets;
   in response to determining, based on the calculating, that the paper supply of the printer is insufficient to print the print job using a set of paper saving attributes and that the paper supply is sufficient to print the print job using a set of proposed paper saving attributes:
      sending a user corresponding to the print job a recommendation to use the set of proposed paper saving attributes; and
      altering the set of paper saving attributes to the set of proposed paper saving in response to receiving a reply that is an affirmative reply; and
   printing a file corresponding to the print job on the printer using the set of paper saving attributes.

2. The method of claim 1 wherein at least one of the paper saving attributes is selected from the group consisting of a duplex option and a multiple pages printed on each page option.

3. The method of claim 1 further comprising:
   retrieving an available number of sheets in the paper supply using a paper quantity sensor that identifies a number of sheets in a paper tray of the printer, wherein the print job is set to use a plurality of sheets from the paper tray during the printing;
   determining a first number of sheets needed to print the print job using the set of paper saving attributes before the altering; and
   determining a second number of sheets needed to print the print job using the set of proposed paper saving attributes, wherein the sending and the altering are performed in response to the first number of sheets being greater than the available number of sheets and the second number of sheets being less than the available number of sheets.

4. The method of claim 1 wherein the determining of the third number of sheets calculates the third number of sheets using zero or more sets of paper saving attributes that each correspond to one of the first set of print jobs that are queued to print before the print job.

5. The method of claim 1 wherein the paper saving attributes include a duplex option and a multiple pages printed on each page option, and wherein the method further comprises:
   determining the multiple pages printed on each page option by identifying a number of pages to print on each side of each sheet of paper.

6. The method of claim 1 further comprising:
   in response to a time period elapsing without receiving the reply from the user, retrieving a default reply and using the default reply as the reply.

7. An information handling system comprising:
   one or more processors;
   a memory coupled to at least one of the processors;
   a printer that includes a paper tray and a paper quantity sensor that identifies a paper supply that is an available number of sheets in the paper tray; and
   a set of computer program instructions stored in the memory and executed by at least one of the processors in order to perform actions comprising:
      retrieving an available number of sheets in a paper supply using a paper quantity sensor that identifies a number of sheets in a paper tray of the printer, wherein a print job is set to use a plurality of sheets from the paper tray during the printing, and wherein the print job is queued in a print queue that includes a plurality of print jobs including the print job;

determining a first number of sheets needed to print the print job using the set of paper saving attributes before the altering;

determining a second number of sheets needed to print the print job using the set of proposed paper saving attributes;

determining a third number of sheets needed to print a first set of the plurality of print jobs that are queued to print before the print job;

calculating a first total number of sheets by adding the first number of sheets and the third number of sheets, and calculating a second total number of sheets by adding the second number of sheets and the third number of sheets, wherein the sending and the altering are performed in response to the first total number of sheets being greater than the available number of sheets and the second total number of sheets being less than the available number of sheets;

in response to determining, based on the calculating, that the paper supply of the printer is insufficient to print the print job using a set of paper saving attributes and that the paper supply is sufficient to print the print job using a set of proposed paper saving attributes:

sending a user corresponding to the print job a recommendation to use the set of proposed paper saving attributes; and altering the set of paper saving attributes to the set of proposed paper saving in response to receiving a reply that is an affirmative reply; and printing a file corresponding to the print job on the printer using the set of paper saving attributes.

8. The information handling system of claim 7 wherein at least one of the paper saving attributes is selected from the group consisting of a duplex option and a multiple pages printed on each page option.

9. The information handling system of claim 7 wherein the actions further comprise:

determining a first number of sheets needed to print the print job using the set of paper saving attributes before the altering; and determining a second number of sheets needed to print the print job using the set of proposed paper saving attributes, wherein the sending and the altering are performed in response to the first number of sheets being greater than the available number of sheets and the second number of sheets being less than the available number of sheets.

10. The information handling system of claim 7 wherein the determining of the third number of sheets calculates the third number of sheets using zero or more sets of paper saving attributes that each correspond to one of the first set of print jobs that are queued to print before the print job.

11. The information handling system of claim 7 wherein the paper saving attributes include a duplex option and a multiple pages printed on each page option, and wherein the actions further comprise:

determining the multiple pages printed on each page option by identifying a number of pages to print on each side of each sheet of paper.

12. The information handling system of claim 7 wherein the actions further comprise:

in response to a time period elapsing without receiving the reply from the user, retrieving a default reply and using the default reply as the reply.

13. A computer program product comprising:

a computer readable storage medium, comprising computer program code that, when executed by an information handling system that includes a printer, executes actions comprising:

retrieving an available number of sheets in a paper supply using a paper quantity sensor that identifies a number of sheets in a paper tray of the printer, wherein a print job is set to use a plurality of sheets from the paper tray during the printing, and wherein the print job is queued in a print queue that includes a plurality of print jobs including the print job;

determining a first number of sheets needed to print the print job using the set of paper saving attributes before the altering;

determining a second number of sheets needed to print the print job using the set of proposed paper saving attributes;

determining a third number of sheets needed to print a first set of the plurality of print jobs that are queued to print before the print job;

calculating a first total number of sheets by adding the first number of sheets and the third number of sheets, and calculating a second total number of sheets by adding the second number of sheets and the third number of sheets, wherein the sending and the altering are performed in response to the first total number of sheets being greater than the available number of sheets and the second total number of sheets being less than the available number of sheets;

in response to determining, based on the calculating, that the paper supply of the printer is insufficient to print the print job using a set of paper saving attributes and that the paper supply is sufficient to print the print job using a set of proposed paper saving attributes:

sending a user corresponding to the print job a recommendation to use the set of proposed paper saving attributes; and altering the set of paper saving attributes to the set of proposed paper saving in response to receiving a reply that is an affirmative reply; and printing a file corresponding to the print job on the printer using the set of paper saving attributes.

14. The computer program product of claim 13 wherein at least one of the paper saving attributes is selected from the group consisting of a duplex option and a multiple pages printed on each page option.

15. The computer program product of claim 13 wherein the actions further comprise:

retrieving an available number of sheets in the paper supply using a paper quantity sensor that identifies a number of sheets in a paper tray of the printer, wherein the print job is set to use a plurality of sheets from the paper tray during the printing;

determining a first number of sheets needed to print the print job using the set of paper saving attributes before the altering; and determining a second number of sheets needed to print the print job using the set of proposed paper saving attributes, wherein the sending and the altering are performed in response to the first number of sheets being greater than the available number of sheets and the second number of sheets being less than the available number of sheets.

16. The computer program product of claim 13 wherein the determining of the third number of sheets calculates the third number of sheets using zero or more sets of paper saving attributes that each correspond to one of the first set of print jobs that are queued to print before the print job.

17. The method of claim 13 wherein the paper saving attributes include a duplex option and a multiple pages printed on each page option, and wherein the actions further comprise:
   determining the multiple pages printed on each page option by identifying a number of pages to print on each side of each sheet of paper.

* * * * *